Figure 1:
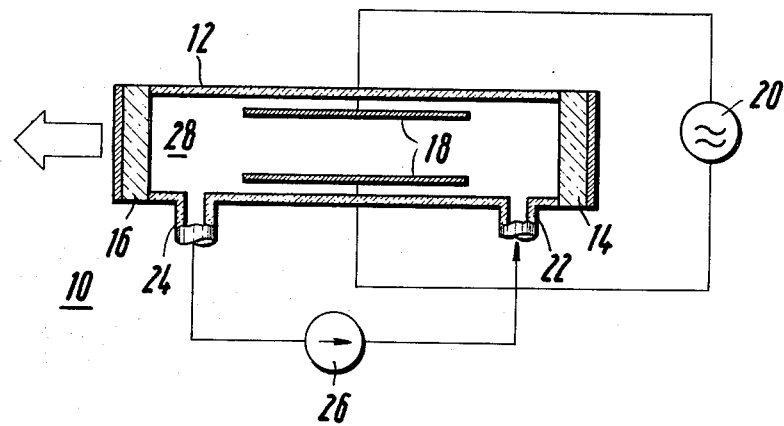

United States Patent [19]
Zachariasse

[11] 3,988,699
[45] Oct. 26, 1976

[54] ELECTROCHEMILUMINESCENCE LASER

[75] Inventor: Klaas Zachariasse, Gottingen, Germany

[73] Assignee: Max-Planck-Gesellschaft zur Förderung der Wissenschaften e.V., Gottingen, Germany

[22] Filed: May 30, 1975

[21] Appl. No.: 582,238

[30] Foreign Application Priority Data
May 31, 1974 Germany............................ 2426367

[52] U.S. Cl. .............................. 331/94.5 L; 330/4.3
[51] Int. Cl.² ............................................. H01S 3/20
[58] Field of Search...................... 331/94.5; 330/4.3

[56] References Cited
UNITED STATES PATENTS

| | | | |
|---|---|---|---|
| 3,835,417 | 9/1974 | Schafer............................... | 331/94.5 |
| 3,904,982 | 9/1975 | Dienes et al....................... | 331/94.5 |
| 3,906,399 | 9/1975 | Dienes et al....................... | 331/94.5 |

*Primary Examiner*—William L. Sikes
*Attorney, Agent, or Firm*—Wlliam R. Woodward; Flynn & Frishauf

[57] ABSTRACT

Organic radical anions and cations are formed by passage of electric current through compounds to be ionized in solution in an organic solvent and the anions and cations are allowed to combine to form excited molecular associations (exciplexes) in a laser resonator where they give up their excitation energy by stimulated emission of radiation to form a laser beam. The necessary ions can be excited with interelectrode voltages of the order of 3 to 10 volts. Aromatic hydrocarbons are used to produce anions and electron donor molecules such as para-tri-substituted triphenylamines (tri-p-tolylamine) to produce cations in solution in tetrahydrofuran or a tetrahydrofuran derivative. Excimer-forming aromatic hydrocarbons or derivatives and di-aryl alkanes can be used to produce both anions and cations that will form exciplexes capable of producing laser radiation.

5 Claims, 2 Drawing Figures

U.S. Patent  Oct. 26, 1976  3,988,699

ELECTROCHEMILUMINESCENCE LASER

It is known that organic radical anions ($A_1^-$) and organic radical cations ($A_2^+$) can react together in a high yield reaction to produce excited molecule associates, so-called "exciplexes" (complexes in the electronically excited state) that exist only in the excited condition, the reaction being expressed as follows:

$$A_1^- + A_2^+ \rightarrow [A_1^* A_2].$$

If the particles coming together are identical ($A_1 = A_2$) the molecule association is also referred to as an "excimer", whereas the case of unlike components ($A_1 \neq A_2$) are referred to as "hetero-excimers". Exciplexes can give up their excitation energy in the form of luminescence radiation: see e.g. the article of A. Weller and K. Zachariasse in "Chemical Physics Letters", Vol. 10, No. 5, Sept. 1, 1971, pp. 590 to 594 and the references there provided, particularly citations (1) to (4).

In the publication of Nakashima, Mataga, Yamanaka, Ide and Misumi in "Chemical Physics Letters", Vol. 18, No. 3, Feb. 1, 1973, pp. 386–389, an optically pumped laser is described in which the intramolecular exciplex emission of p-(9'-anthryl)-N,N-dimethylaniline, also known as ADMA, is intended to be used to generate radiation. The great expense necessary for the optical pumping is a disadvantage of this known laser. The use of intermolecular exciplexes (exciplexes of ions of different kinds of molecules) as a laser-active material is regarded as unlikely (loc.cit., p. 386, left column, last paragraph) on account of the strong absorption bands present in many cases in the region of the exciplex emission spectra.

It is an object of the present invention to provide a liquid laser that is distinguished by a high efficiency and simple construction.

SUBJECT MATTER OF THE PRESENT INVENTION

Briefly, in accordance with the invention laser radiation is generated by producing molecule complexes (exciplexes) excited in a liquid containing at least one excimer-forming aromatic hydrocarbon material by conduction of an electric current therethrough, which complexes are capable of giving up their excitation energy by stimulated emission of radiation. The exciplexes so produced and used are complexes containing two or more "co-excimerized" organic radicals: they may be excimers or hetero-excimers, either intermolecular or intramolecular.

An electrochemical luminescence laser in accordance with the present invention comprises a laser tube filled with a solution in which ions can be produced by the passage of current, which ions can associate or link up one to another in the formation of excited molecule complexes (exciplexes), and an electrode system maintained in contact with the liquid and connected to a current source.

Preferably there is used a liquid of such a kind that hetero-excimers are produced by the passage of current.

The electrochemical luminescence laser of the present invention has the advantage that it can be driven with low voltages and that its population inversion amounts to 100%, since the exciplexes are not capable of existing in the unexcited state (ground state). The materials $A_1$ and $A_2$ utilized to produce exciplexes are both stable, so that here also no problems arise. The known molecule associations known from the abovementioned publications of Weller and Zachariasse can be produced as exciplexes in lasers according to the present invention. In the present case, mostly dimer molecule associations are of interest. Examples of such exciplexes are molecule associates or aggregates formed of anions of aromatic hydrocarbons with cations of electron-donor molecules such as para-tri-substituted triphenylamines, for example tri-p-tolylamine Exciplexes Excilexes can also be produced from dimethylanthracene in combination with TPTA in tetrahydrofuran (TF) 2-methyltetrahydrofuran (MTHF) or from anthracene/TPTA. The efficiency can in some cases be raised by cooling the solution.

The luminescence of such molecule associations in excited condition (exciplexes) consists of a board unstructured band. The spectral region from 600 nm to 350 nm can be covered. This makes possible effective tuning of the laser at various emission wave lengths in a broad spectral region.

The laser can be operated in a flow-through mode or process, i.e. the laser-active liquid can be kept in circulation in a path that passes through a tube with Brewster windows and the like in the radiation path of the laser. The two components $A^-$ and $A^+$ can be produced in separate flow channels by passage of current and can be mixed before entrance into the laser tube in the radiation path. $A^-$ and $A^+$ can indeed preferably be also produced simultaneously within the laser tube by means of an alternating voltage.

The invention can be applied both to laser oscillators and to laser amplifiers.

Figure 2:
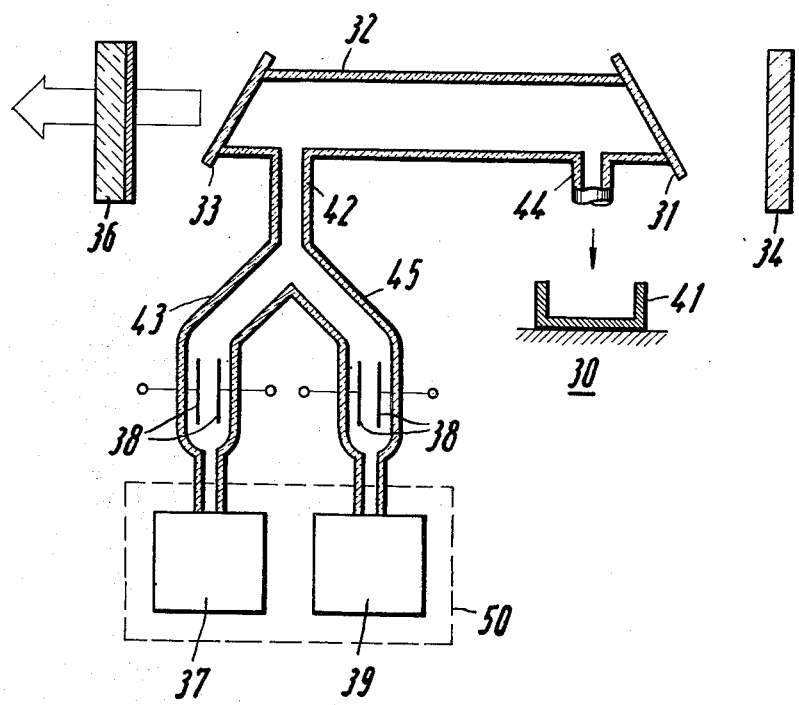

The invention is further described by way of example with reference to the drawing, in which:

FIG. 1 is a schematic sectional view of a first embodiment of the invention, and FIG. 2 is a schematic sectional view of a second embodiment of the invention.

In FIG. 1 there is shown an electrochemiluminescence laser 10 which includes a liquid-tight laser tube 12 of insulating material, for example glass, the ends of which are closed off respectively by a 100% reflecting mirror 14 and a partially reflecting mirror 16. The mirrors 14 and 16 provide a conventional optical resonant cavity out of which the generated laser radiation can come out by the partially transparent mirror 16. Along two opposite sides of the tube within the laser tube 12 are respectively located two longitudinal electrodes 18 connected to a source 20 of alternating voltage. The a.c. source 20 needs to deliver a voltage of, for example, only 3 to 10 volts. The invention is accordingly applicable for the widest variety of purposes. One example of application, for instance, is the provision of displays.

A laser tube is provided with two connection stub branches 22 and 24 respectively in the neighborhood of its two ends by which it can be inserted into a liquid circulation system in which circulation is maintained by circulating pump 26.

The laser tube 12 and the liquid circulation system are filled with a solution 28 that contains a dissolved laser-active material. The solution can contain, for example, tri-p-tolylamine (TPTA) and for example anthracene or 9-methylanthracene or 9, 10-dimethylanthracene, dissolved in tetrahydrofuran (THF) or 2-methyltetrahydrofuran (MTHF). The molar concentration of the dissolved materials can typically be in the range from $10^{-3}$ to $10^{-6}$. The solution can also contain a basic electrolyte to improve the conductivity, for example 0.1 M tetra-n-butylammonium perchlorate (TBAP).

Along with intermolecular exciplexes, intramolecular exciplexes can also be used, for example an excited $\alpha,\omega$ - di -(1-pyrenyl) alkane:

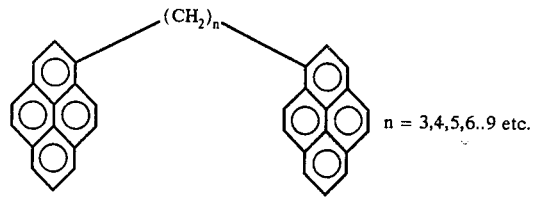

n = 3,4,5,6..9 etc.

FIG. 2 shows an embodiment of the invention suitable for producing laser radiation by the release of energy from hetero-excimers, that is, from excited intermolecular associations. In this case separate solutions of the respective materials from which anion and cations are to be produced are supplied by the respective supply vessels 37 and 39 through the respective tubes 43 and 45 in which they are excited to produce ions by the electrodes 38 that are connected respectively to voltage sources not shown in the diagram. These solutions issue from the tubes 43 and 45 to mix in the inlet tube 42 of the laser tube 32 and they react to form hetero-excimers in the laser tube, as the mixed solutions proceed through the tube towards the exit connection 44 from which they are discharged into a collecting vessel 41. The tube 32 has Brewster windows 31 and 33 located within a laser resonance chamber defined by the full mirror 34 and the partial mirror 36. In this resonator the hetero-excimers formed by the radical anions and radical cations reacting together give up their excitation energy by stimulated emission of radiation and the resulting radiation forms a coherent laser beam in the well-known way. Since the liquid collected in the vessel 41 has given up its excitation energy as described, the molecular associations are dissociated and the two kinds of molecules can be separated by conventional means for re-use.

The aromatic hydrocarbons and aromatic hydrocarbon derivatives that are excimer-forming are in general compounds containing cyano, dialkylamino, methoxy or carbomethoxy substituent groups. To make a solution of such an excimerforming hydrocarbon material to form a laser-active liquid in accordance with the present invention, it is desirable, in the case of exciplex lasers using hetero-excimers $[A_1 {=}^* A_2]$ as the emitting substance, to use a solvent having a dielectric constant $\epsilon$ not higher than 8 in order to avoid a quenching effect, but in the case of exciplex lasers using excimers $[A{=}^*A]$ there is no restriction on the polarity of the solvent, which is to say no restriction on the dielectric constant, because in this case the emission intensity and wavelength is not dependent on solvent polarity. By "excimer-forming aromatic hydrocarbon materials" are meant excimer-forming substituted or unsubstituted aromatic hydrocarbon compounds or complex-forming combinations of such compounds. By exciplexes are meant excimers $[A{=}^*A]$ and hetero-excimers $[A{=}^*A_2]$, both intermolecular, where A, $A_1$ and $A_2$ are separate molecules linked only by exciplex formation, and intramolecular, where A, $A_1$ and $A_2$ are excimer-forming aromatic organic radicals within a molecule which also contains another excimer-forming organic radical, with which the exciplex is formed. The term does not mean an excited molecule in which the excitation is produced by the combination of a hydrogen ion and a neutral organic dye molecule, a form of combination known as "protonation" in which only a single organic radical takes part. In other words, only exciplexes containing two or more co-excimerized organic radicals are meant. Co-excimerized means simply excimerized in the cases where the two organic radicals have the same chemical structure and composition, but is broad enough to apply to cases of different organic radicals (i.e. to hetero-excimers).

I claim:
1. Electrochemiluminescence laser comprising a laser tube within which is provided a laser-active liquid comprising a solvent and at least one dissolved excimer-forming aromatic hydrocarbon material and further comprising electrodes in contact with said liquid in said laser tube and connected to a voltage source, the nature of said dissolved material and the output of said voltage source being such as to generate exciplexes containing a plurality of co-excimerized organic radicals by passage of current through said laser-active liquid, which exciplexes are capable of transitions into a state of lower energy upon stimulated emission of radiation.

2. Laser according to claim 1, in which said laser-active liquid is a solution in which intermolecular exciplexes are producible by passage of electric current utilizing a solvent having a dielectric constant no greater than 8.

3. Laser according to claim 1, in which said laser-active liquid is a solution in which intramolecular exciplexes are producible by passage of electric current.

4. Laser according to claim 1, in which there is also included means for cooling said laser-active liquid.

5. Method of generating laser radiation by means of a laser-active liquid composed of a solvent and at least one dissolved excimer-forming aromatic hydrocarbon material, comprising the steps of:
producing excited molecule complexes (exciplexes) containing a plurality of co-excimerized organic radicals by passage of an electrical current through a laser-active liquid, and
allowing said excited molecule complexes to give up energy by stimulated emission of radiation in a laser resonator to produce a laser beam.

* * * * *

UNITED STATES PATENT AND TRADEMARK OFFICE
CERTIFICATE OF CORRECTION

PATENT NO. : 3,988,699
DATED : October 26, 1976
INVENTOR(S) : Klaas ZACHARIASSE

It is certified that error appears in the above-identified patent and that said Letters Patent are hereby corrected as shown below:

Col. 1, line 50, delete""co-excimerized" " and in its place insert -- exciplex-forming --.

Col. 4, line 9, after "where" delete the remainder of this line;

lines 10 and 11, cancel the entire context of these lines;

line 12, cancel everything up to and including the period (.) and insert -- A and A (in the excimer [$A^*A$]) or $A_1$ and $A_2$ (in the hetero-excimer [$A_1^*A_2$]) are linked together chemically, e.g. via an alkane chain as in $A_1(CH)_nA_2$. --;

Line 13, delete "an excited" and substitute -- a --, and after "molecule" delete the remainder of the line;

Lines 14 and 15, cancel all of line 14 and everything down to and including the comma (,) in line 15, and insert in place thereof:
-- brought into the excited state by absorption of electromagnetic radiation which produces a new molecular species in the excited state by chemical combination with a hydrogen ion and a neutral organic dye molecule in the excited state, --;

Line 19, after the period (.), cancel the remainder of the line;

Lines 21 - 24, cancel the entire context of these lines and insert in their place: -- The word "radicals" is used rather than "molecules" here simply because in the case of the present invention, electrically generated radical ions are used rather than neutral molecules to form exciplexes.--;

.../

UNITED STATES PATENT AND TRADEMARK OFFICE
CERTIFICATE OF CORRECTION

PATENT NO. : 3,988,699
DATED : October 26, 1976
INVENTOR(S) : Klaas ZACHARIASSE

It is certified that error appears in the above-identified patent and that said Letters Patent are hereby corrected as shown below:

In the Claims:

Col. 4, claim 1, lines 27 and 28, change "excimer-forming" to -- exciplex-forming --; and after "aromatic" delete "hydrocarbon material" and in its place insert -- organic compound --;

Col. 4, claim 1, line 33, delete "containing" and in its place insert -- each of which is formed by --, and delete "co-excimerized" and substitute -- exciplex-forming --.

Col. 4, claim 5, line 49, delete "excimer-forming" and insert in place thereof -- exciplex-forming --, and delete "hydrocarbon material" ending on line 50, and insert in its place -- organic compound --;
Line 51, delete "excited molecule" and substitute -- molecular --, and after "complexes" insert -- in the excited state --;
Line 52, delete "co-excimerized" and substitute -- exciplex-forming --.

Signed and Sealed this

Eighth Day of February 1977

[SEAL]

Attest:

RUTH C. MASON
*Attesting Officer*

C. MARSHALL DANN
*Commissioner of Patents and Trademarks*